March 22, 1960  W. S. DAVENPORT  2,929,206
FLUID IMPINGEMENT NOZZLE MOUNTING ARRANGEMENT
FOR STARTING AN AVIATION GAS TURBINE ENGINE
Filed Jan. 18, 1956

INVENTOR
WILLIAM S. DAVENPORT
BY
AGENT

United States Patent Office 2,929,206
Patented Mar. 22, 1960

2,929,206

FLUID IMPINGEMENT NOZZLE MOUNTING ARRANGEMENT FOR STARTING AN AVIATION GAS TURBINE ENGINE

William S. Davenport, Overland Park, Kans., assignor to Westinghouse Electric Corporation, East Pittsburgh, Pa., a corporation of Pennsylvania Application January 18, 1956, Serial No. 559,903

4 Claims. (Cl. 60—39.14)

This invention relates to starting structure for an aviation gas turbine engine, more particularly to a starting system of the air impingement type, and has for an object to provide an improved arrangement of this type.

It is customary, in fact essential, to rotate the rotor of a gas turbine engine until it attains a speed sufficiently high to permit self-energization by combustion of fuel admitted to the combustion chamber. Various arrangements for thus initiating rotation of the rotor have been proposed with varying degrees of success. In the aviation gas turbine field, to which this invention is particularly applicable, it is especially desirable to provide starting structure of simple yet reliable construction which imposes the least possible weight penalty on the engine in flight.

It has been proposed to provide a fixed air nozzle adjacent the downstream edge of the last rotating turbine blade row and inclined in such a manner relative to the blading that the blast of compressed air issuing from the air nozzle impinges thereon and initiates rotation of the rotor. Although this arrangement is highly satisfactory from a functional viewpoint, it does impose some weight penalty on the engine.

In view of the above, it is another object of the invention to provide an air impingement starting arrangement for an aviation gas turbine engine which imposes a minimum weight penalty on the engine.

A further object is to provide an air impingement starting structure of the above type which is detachable from the engine when not in use.

Briefly, the invention resides in providing a nozzle at the end of a tube connected to a source of compressed air and providing interengaging detachable support members on the air nozzle and the inner wall of the exhaust collector of the gas turbine engine. The support members carried by the exhaust collector are disposed in a manner to position the air nozzle in proper alignment with the outlet edges of the last row of turbine rotor blades, so that the compressed air issuing from the air nozzle at high velocity impinges on said blades at the optimum angle for rotating the same.

In operation, the air nozzle is inserted into the exhaust collector from the outlet end thereof in a manner to permit interengagement of the support members on the nozzle with the support members in the exhaust collector. The compressed air is then turned on until the engine rotor becomes self-actuated, whence it is turned off and the air nozzle disengaged from the support members carried by the exhaust collector and removed from the engine. With this arrangement, the only weight penalty imposed on the engine after starting is that of the support members carried by the exhaust collector.

These and other objects are effected by the invention as will be apparent from the following description and claims taken in connection with the accompanying drawing, forming a part of this application, in which:

Figure 1:
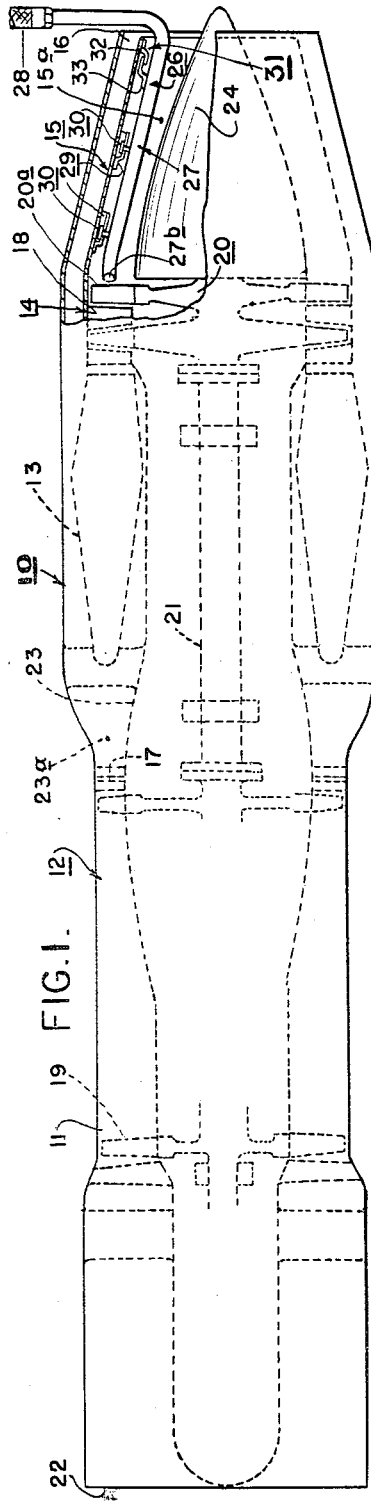
Fig. 1 is a schematic plan, with a portion in section, of an aviation turbojet engine having the invention incorporated therein.

Referring to Fig. 1 of the drawing in detail, there is shown somewhat schematically a conventional turbo-jet engine 10 having the usual outer shell 11 within which are disposed in axial alignment the operating elements of the engine. The operating elements include a compressor section 12, an annular combustion chamber 13, a turbine section 14 and an exhaust collector 15 terminating in an exhaust outlet nozzle 16. The compressor section 12 and the turbine section 14 are provided with the usual stationary blading 17 and 18, respectively, and bladed rotors 19 and 20 connected to each other by means of a drive shaft 21 so that, in operation, the turbine rotor 20 serves to drive the compressor rotor 19 in a manner well known in the art. The turbo-jet engine is also provided with an air inlet 22, whereby air is admitted to the engine for combustion purposes. Within the outer shell 11, there is provided central core structure 23 defining with the outer shell an annular passageway 23a for the delivery of compressed air from the compressor section 12 to the combustion chamber 13.

Briefly, the operation of the above-described turbo-jet engine is as follows: air is admitted through the air inlet 22 into the compressor section 12, where it is pressurized and delivered through the annular passageway 23a to the combustion chamber 13 wherein it supports combustion of fuel delivered thereto by any desirable means (not shown). The hot products of combustion flow through the turbine section 14 and are expanded therein as they flow through an annular row of airfoil shaped rotor blades 20a, thereby imparting part of their energy to drive the turbine rotor 20. Since the turbine rotor is connected to the compressor rotor 19 by the drive shaft 21, the engine is thus self-actuated and will continue to operate provided the initial speed of the turbine rotor is sufficiently high to permit such self-actuation. After the gases flow through the turbine section 14, they flow through the annular exhaust passageway 15a, defined by the exhaust collector 15 and a central fairing member 24, and out the exhaust nozzle 16 to the atmosphere in the form of a propulsive jet to drive the aircraft to which the turbojet is attached, in a well known manner.

According to the invention, engine starting structure of the air impingement type, generally designated 26, is provided for initiating rotation of the turbine rotor 20 to a sufficiently high speed to permit self-actuation of the engine.

Figure 3:
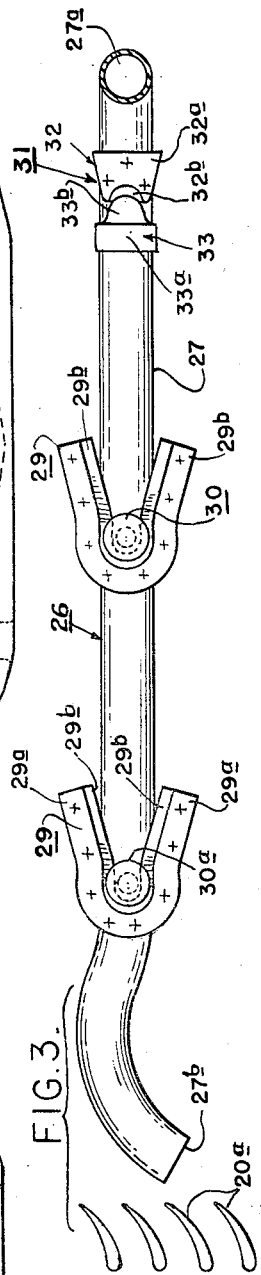
Fig. 3 is a view taken on line III—III of Fig. 2, looking in the direction of the arrows.
Figure 2:
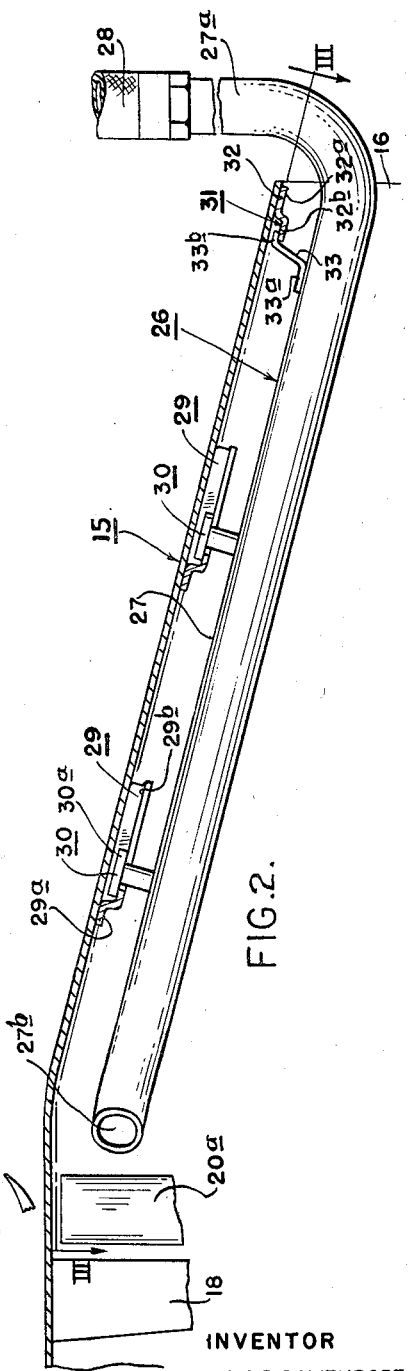
Fig. 2 is an enlarged fragmentary view of the portion shown in section in Fig. 1.

Referring to Figs. 1, 2 and 3, especially Figs. 2 and 3, the engine starting structure 26 has an air nozzle 27 of rigid construction having a bent end portion 27a attached to a flexible hose 28 which is connectible to a source of pressurized fluid such as compressed air (not shown). The air nozzle 27 is disposed within the exhaust passageway 15a and has an air outlet portion 27b disposed adjacent the downstream edges of the rotor blades 20a of the turbine. The outlet 27b of the nozzle is also aligned with the blading 20a at the optimum angle with the axis of the engine for driving the turbine rotor by impingement of the air ejected therefrom onto the blading 20a so that, when it is desired to start the turbojet engine 10, air is delivered from the compressed air source through the flexible hose 28 and thence through the air nozzle 27 and through the outlet 27b thereof at high velocity onto the blading 20a to initiate rotation thereof. Such rotation is of a constantly accelerating nature, so that the turbine rotor increases its speed until it is sufficient to permit self-actuation of the engine upon introduction of fuel into the combustion chamber 13 and ignition thereof.

A plurality of sets of inter-engaging supporting members comprising first elements 29 and second elements 30 are provided for supporting the air nozzle 27 in the desired position within the exhaust collector 15. Also, interlocking means 31 are provided for locking the air nozzle 27 in the desired position within the exhaust collector.

The inter-engaging members 29 and 30 are attached to the inner wall of the exhaust collector 15 and to the outer wall of the air nozzle 27, respectively. Each of the elements 30 is in the form of a stud having an enlarged head portion 30a, while each of the elements 29 is preferably of V-shape and of such cross-section that an outer V-shaped mounting flange 29a is formed which is attached to the exhaust collector 15, while a smaller inner V-shaped flange 29b is provided which is disposed in spaced relation with the inner wall of the exhaust collector. The V-shaped elements 29 are attached to the exhaust collector in such a manner that the bights thereof face in rearward direction, that is, towards the exhaust nozzle 16. Also, the spacing between the inner flanges 29b and the inner wall surface of the exhaust collector is such that the head portion 30a of the stud 30 is freely receivable therebetween and confined therein when the stud 30 is in fully engaged position within the element 29.

The interlocking structure 31 is provided with two separable portions 32 and 33. The portion 32 has a mounting flange portion 32a attached to the inner wall of the exhaust collector 15 and a semi-circular recess portion 32b spaced from the inner wall of the exhaust collector. The interlocking portion 33 is of generally Z-shape having a flange portion 33a attached to the air nozzle 27 and having a flange portion 33b of semi-circular contour disposed in overlapping engagement with the recess 32b to form the interlock. The interlocking structure 31 is preferably disposed adjacent the exhaust nozzle 16 for a purpose which will subsequently be described. Also, the two sets of coacting supporting members 29 and 30 are disposed in spaced relation with each other along the length of the air nozzle.

As shown in the drawings, the air nozzle is in operative position, so that it is only necessary to turn on the air flow through the nozzle 27 to provide the air blast for initiating operation of the engine by impingement on the turbine rotor blading, in the manner described previously. After the engine is self-actuating or self-sustaining, the air supply to the nozzle is shut off and the air nozzle 27 is removed from the exhaust collector through the exhaust nozzle opening 16 in the following manner. The air nozzle 27 is grasped in the region adjacent the bent portion 27a and moved upstream relative to the flow of the exhaust gases through the exhaust nozzle 16 an amount sufficient to disengage the overlapping flange 33b and the recess 32b of the interlocking structure 31. The air nozzle 27 may then be moved radially inwardly a short distance to provide clearance between the flange 33b and recess 32b and removed from the exhaust nozzle opening 16 by pulling on the nozzle portion 27a in the same direction as the flow of the exhaust gases through the exhaust nozzle, whereupon the heads 30a of the studs 30 are moved out of overlapping relation with the flanges 29b of the V-members 29, permitting rapid removal of the air nozzle from the exhaust collector by a single continuous movement.

To insert the air nozzle into the exhaust passage 15a and attach the same to the exhaust collector, the above sequence of operations is reversed.

Although in the air nozzle supporting arrangement illustrated, the V-shaped members 29 are attached to the exhaust collector wall 15 and the studs 30 are attached to the nozzle 27, obviously the parts may be reversed in a simple manner within the scope of the invention. Also, although not shown, the supporting members 29, 30 and the interlocking structure 31 may be carried by the central fairing member 24 instead of the exhaust collector, if desired.

Although the outlet 27b of the nozzle 27 has been shown as generally circular, it may be of any other shape consistent with aerodynamic practice. Since, after the engine becomes self-actuating the air nozzle 27 is removed from the engine, the weight thereof imposes no weight penalty on the engine during flight, so that the only weight permanently imposed on the engine is that of the V-shaped members 29 and the interlocking member 32 which is relatively negligible.

It will be seen that the invention provides a simple, yet reliable, air impingement type engine starting structure for an aviation turbine engine which is readily attachable and detachable from the engine when the engine is on the ground so that, after starting the engine, the starting structure may be used on other engines, thereby obviating the need for an individual starting structure for each engine; that is, one starting structure may be used on numerous engines in consecutive manner provided that the engines are equipped with the supporting and interlocking means for the air nozzle 27.

It will further be seen that since the air nozzle is not permanently attached to the engine, its size and weight is not material to the engine and may be designed for optimum performance and durability.

While the invention is shown in but one form, it will be obvious to those skilled in the art that it is not so limited, but is susceptible of various other changes and modifications without departing from the spirit thereof.

What is claimed is:

1. For use in starting an aviation gas turbine engine having a bladed turbine rotor and a tubular exhaust collector communicating with said rotor; the combination comprising a fluid conducting nozzle connectible to a source of fluid under pressure, means for detachably supporting said nozzle within said exhaust collector in a position to deliver fluid at high velocity to said bladed rotor, said supporting means including mutually engageable first and second support members attached to the inner wall of said exhaust collector and said nozzle, respectively, and interlocking means for maintaining said first and second members in engagement, said first support member being of V-shape with its bight facing the outlet of the exhaust collector and having a pair of converging surfaces, and said second support member comprising a stud provided with an enlarged head portion, said stud being received in the bight of said first support member and said head portion engaging said converging surfaces.

2. For use in starting an aviation gas turbine engine having a turbine rotor provided with an annular row of airfoil shaped blades, and wall structure defining an annular exhaust passage for gases leaving said turbine blades; the combination comprising a rigid fluid conducting nozzle connectible to a source of fluid under pressure, said nozzle having a fluid ejecting outlet, means for detachably supporting said nozzle within said exhaust passage with the nozzle outlet adjacent said turbine rotor blades, said supporting means including a set of mutually engageable members, said set of members comprising a first member attached to said wall structure and a second member attached to said nozzle, and interlocking means for maintaining said first and second members in engagement, one of said support members having a pair of opposed surface portions disposed in spaced relation with said wall structure and the other of said support members comprising a stud provided with an enlarged head portion, said stud being received between said opposed surface portions and said head portion being received between said wall structure and said opposed surface portions.

3. For use in starting an aviation turbojet engine having wall structure defining an annular motive gas passageway, a turbine rotor having an annular row of blades extending into said passageway to drive said rotor by extracting energy from the motive gases, and a tubular exhaust collector communicating with said gas passageway, said exhaust collector having an exhaust outlet spaced from said rotor; the combination comprising an elongated rigid fluid conducting nozzle of sufficient length to extend from said turbine rotor blades through said exhaust outlet, said nozzle having a fluid ejecting outlet and being connectible to a source of fluid under pressure disposed externally of said exhaust collector, a plurality of interengageable detachable support members attached to the inner wall of said exhaust collector and said nozzle, whereby said nozzle may be inserted through said exhaust outlet into said exhaust collector and supported by the latter, and means for locking said nozzle to said exhaust collector with said fluid ejecting outlet adjacent said rotor blades.

4. For use in starting an aviation turbojet engine having a wall structure defining an annular motive gas passageway, a turbine rotor provided with an annular row of airfoil shaped blades extending into said passageway and extracting energy from the motive gases flowing therethrough to drive said rotor, said wall structure further including a centrally disposed fairing member defining an annular exhaust passage for the expanded motive gases leaving said turbine rotor blades; the combination comprising a rigid fluid conducting nozzle of sufficient length to extend externally beyond said wall structure and connectible to a source of fluid under pressure disposed externally of said engine, said nozzle having a fluid ejecting outlet, means for detachably supporting said nozzle within said exhaust passage, and means for locking said nozzle with the nozzle outlet in registry with said turbine rotor blades, said supporting means including a set of mutually engageable members, said set of members comprising a first member attached to said wall structure and a second member attached to said nozzle, and interlocking means for maintaining said first and second members in engagement.

References Cited in the file of this patent
UNITED STATES PATENTS

| | | |
|---|---|---|
| 2,411,552 | New | Nov. 26, 1946 |
| 2,817,951 | Turner | Dec. 31, 1957 |